US012569869B2

(12) United States Patent
Trydal et al.

(10) Patent No.: US 12,569,869 B2
(45) Date of Patent: Mar. 10, 2026

(54) METHOD OF DETERMINING CHARACTERISTIC OF FLUID, CONTROL SYSTEM, APPARATUS AND ROBOT SYSTEM

(71) Applicant: ABB Schweiz AG, Baden (CH)

(72) Inventors: Jakob Trydal, Kvernaland (NO); Morten Mossige, Nærbø (NO); Yngve Finnestad, Sandnes (NO)

(73) Assignee: ABB Schweiz AG, Baden (CH)

( * ) Notice: Subject to any disclaimer, the term of this patent is extended or adjusted under 35 U.S.C. 154(b) by 299 days.

(21) Appl. No.: 18/256,696

(22) PCT Filed: Dec. 17, 2020

(86) PCT No.: PCT/EP2020/086707
§ 371 (c)(1),
(2) Date: Jun. 9, 2023

(87) PCT Pub. No.: WO2022/128092
PCT Pub. Date: Jun. 23, 2022

(65) Prior Publication Data
US 2024/0033763 A1      Feb. 1, 2024

(51) Int. Cl.
*B05B 12/08*      (2006.01)
*B05B 13/04*      (2006.01)
(Continued)

(52) U.S. Cl.
CPC .......... *B05B 12/08* (2013.01); *B05B 13/0431* (2013.01); *B05B 15/55* (2018.02); *G01N 29/02* (2013.01)

(58) Field of Classification Search
CPC ..... B05B 12/08; B05B 13/0431; B05B 15/55; G01N 29/02; G01N 2291/02809;
(Continued)

(56) References Cited

U.S. PATENT DOCUMENTS

2009/0134241 A1     5/2009   Hoffmann
2019/0154480 A1*    5/2019   Schöb ..................... G01F 15/02

FOREIGN PATENT DOCUMENTS

EP          1797422 B1      4/2011
JP          S58193758 A     11/1983
(Continued)

OTHER PUBLICATIONS

International Preliminary Report on Patentability; Application No. PCT/EP2020/086707; Issued: Jun. 13, 2023; 8 Pages.
(Continued)

*Primary Examiner* — Qingzhang Zhou
(74) *Attorney, Agent, or Firm* — Whitmyer IP Group LLC

(57)      ABSTRACT

A method of determining a characteristic of a fluid in an apparatus for applying a coating medium to an object, the apparatus including a fluid line; an outlet; a first coating medium source; a second coating medium source; a cleaning medium source; and a valve arrangement configured to independently bring each of the first coating medium source, the second coating medium source and the cleaning medium source in communication with the outlet through the fluid line; where the method includes conducting a fluid through the fluid line, the fluid including the first coating medium, the second coating medium and/or the cleaning medium; sending ultrasonic waves to the fluid in the fluid line; sensing echo signals induced in the fluid by the ultrasonic waves; converting the echo signals to electronic response data; and determining a parameter value of at least one parameter of the fluid in the fluid line based on the electronic response data.

14 Claims, 4 Drawing Sheets

(51) Int. Cl.
     *B05B 15/55*          (2018.01)
     *G01N 29/02*          (2006.01)
(58) Field of Classification Search
     CPC ... G01N 2291/02818; G01N 2291/044; G01N
                                             29/024
     See application file for complete search history.

(56)                 References Cited

FOREIGN PATENT DOCUMENTS

| JP | H0631214 | A |   | 2/1994 |
|----|----------|---|---|--------|
| JP | 09285748 | A | * | 11/1997 |
| JP | H09285748 | A |   | 11/1997 |
| JP | 2007144289 | A |   | 6/2007 |
| JP | 4182457 | B2 |   | 11/2008 |

OTHER PUBLICATIONS

International Search Report and Written Opinion of the International Searching Authority; Application No. PCT/EP2020/086707; Completed: Aug. 25, 2021; Mailing Date: Sep. 6, 2021; 11 Pages.
Japanese Office Action; Application No. 2023-535450; Issued: May 7, 2024; 11 Pages.

\* cited by examiner

METHOD OF DETERMINING CHARACTERISTIC OF FLUID, CONTROL SYSTEM, APPARATUS AND ROBOT SYSTEM

TECHNICAL FIELD

The present disclosure generally relates to determination of characteristics of a fluid in a coating apparatus. In particular, a method of determining a characteristic of a fluid in an apparatus for applying a coating medium to an object, a control system for determining a characteristic of a fluid in an apparatus, an apparatus for applying a coating medium to an object, and a robot system comprising an industrial robot, are provided.

BACKGROUND

A painting robot may comprise paints of 20 to 30 different colors. In such painting robot, a solvent may be conducted through a fluid line in order to clean the fluid line from residues from a paint of a first color prior to conducting paint of a second color through the fluid line. It is a challenge to consume as low amounts of solvent as possible while at the same time ensuring that the fluid line becomes clean enough such that the paint of the second color is not contaminated by the paint of the first color.

In some prior art painting apparatuses, a volume of solvent needed for cleaning the fluid line is determined with lab experiments based on a worst-case cleaning scenario. Such worst-case cleaning scenario may for example be when changing colors from black to white. The volume of solvent required for handling the worst-case cleaning scenario is then used in production for all cleaning scenarios. Although this ensures that the fluid line becomes clean, an excessive amount of solvent is often used to clean paint with an "easier" color. In addition, a time for cleaning the fluid line becomes unnecessarily long.

US 2009134241 A1 discloses a painting machine having a spray head for painting an object, a pump for conveying paint from a paint container via a feed line to the spray head and back via a return line to the paint container, the feed and return lines being connected to a solvent container with a solvent for flush cleaning the painting machine. The feed and return lines are connected to a disposal container for disposing of paint and solvent residues, and at their respective container-side end to a first and second controllable multiway valve for switching the feed and return lines to the paint container, solvent container, or disposal container. The painting machine has a control device for controlling the multiway valve such that execution of the consecutive operations of disposal of the paint, filling with solvent, flushing out the painting machine, disposing of the solvent, refilling with paint and also further conveyance of the paint are automated.

JP H09285748 A discloses a color changing device for a coating robot. The color changing device comprises a paint hose, a coating gun, paint supply hoses, a thinner supply hose, a color change valve unit, an ultrasonic transmitter, and an ultrasonic receiver. When liquid is ejected from the coating gun, a concentration of a waste liquid ejected from the coating gun is detected based on a time difference between a time when an ultrasonic wave is transmitted from the ultrasonic transmitter and a time when the ultrasonic wave is received by the ultrasonic receiver. A concentration detecting means comprising the ultrasonic transmitter and the ultrasonic receiver can be provided in the coating gun.

SUMMARY

One object of the present disclosure is to provide an effective method of determining a characteristic of a fluid in an apparatus for applying a coating medium to an object.

A further object of the present disclosure is to provide a method of accurately determining a characteristic of a fluid in an apparatus for applying a coating medium to an object.

A still further object of the present disclosure is to provide a method of determining a characteristic of a fluid in an apparatus for applying a coating medium to an object, which method enables a reduced consumption of cleaning medium and a faster switching between different coating mediums.

A still further object of the present disclosure is to provide a method of determining a characteristic of a fluid in an apparatus for applying a coating medium to an object, which method effectively avoids a subsequently applied second coating medium to become contaminated by a previously applied first coating medium.

A still further object of the present disclosure is to provide a method of determining a characteristic of a fluid in an apparatus for applying a coating medium to an object, which method can be implemented in an existing apparatus for applying a coating medium to an object.

A still further object of the present disclosure is to provide a method of determining a characteristic of a fluid in an apparatus for applying a coating medium to an object, which method solves several or all of the foregoing objects in combination.

A still further object of the present disclosure is to provide a control system for determining a characteristic of a fluid in an apparatus for applying a coating medium to an object, which apparatus solves one, several or all of the foregoing objects.

A still further object of the present disclosure is to provide an apparatus for applying a coating medium to an object, which apparatus solves one, several or all of the foregoing objects.

A still further object of the present disclosure is to provide a robot system solving one, several or all of the foregoing objects.

According to one aspect, there is provided a method of determining a characteristic of a fluid in an apparatus for applying a coating medium to an object, the apparatus comprising a fluid line; an outlet; a first coating medium source containing a first coating medium; a second coating medium source containing a second coating medium; a cleaning medium source containing a cleaning medium; and a valve arrangement configured to independently bring each of the first coating medium source, the second coating medium source and the cleaning medium source in communication with the outlet through the fluid line; where the method comprises conducting a fluid through the fluid line, the fluid comprising the first coating medium, the second coating medium and/or the cleaning medium; sending ultrasonic waves to the fluid in the fluid line; sensing echo signals induced in the fluid by the ultrasonic waves; converting the echo signals to electronic response data; and determining a parameter value of at least one parameter of the fluid in the fluid line based on the electronic response data.

By means of the at least one parameter value determined based on ultrasonic waves having interacted with the fluid, a wide range of characteristics of the fluid in the fluid line can be accurately and effectively provided. Each parameter may be representative of a characteristic of the fluid. For example, a parameter in the form of speed of sound is representative of a chemical composition of the fluid.

Throughout the present disclosure, a characteristic of the fluid may be a characteristic associated with a cleanliness of the fluid, i.e. the absence of a coating medium. The method thereby enables a cleaning with the cleaning medium to be performed only as long as necessary. Thus, the method enables an optimized use of time and cleaning medium when cleaning each type of coating medium. Consequently, an amount of cleaning medium can be reduced, and a downtime between application of the first coating medium to the object and a subsequent application of the second coating medium to the object can be reduced.

The method can also be implemented in an existing apparatus for applying a coating medium to an object, e.g. by adding an ultrasonic device and a control system as described herein to the existing apparatus. For example, the fluid line does not have to be transparent in order to subject the fluid to ultrasonic waves. The method thus enables an effective retrofitting to a prior art coating apparatus.

The coating medium may be paint. Thus, the first coating medium may be paint of a first type or color, and the second coating medium may be a paint of a second type or color. Alternatively, or in addition, the coating medium may be varnish.

The cleaning medium may be a solvent. Alternatively, or in addition, the apparatus may comprise a plurality of cleaning medium sources, each containing a unique cleaning medium.

The valve arrangement may comprise a valve associated with each of the first coating medium source, the second medium source and the cleaning medium source. Each valve may for example be a 2/2 valve. The method may employ an apparatus of any type as described herein.

The method may further comprise controlling the valve arrangement based on the at least one parameter value. In this way, the method provides a closed loop control of the valve arrangement.

The at least one parameter value may be determined in real time. In this way, one or more characteristics of the fluid inside the fluid line can be continuously monitored. This enables a dynamic control of the apparatus based on the at least one parameter.

For example, instead of executing a predetermined cleaning sequence based on a worst-case cleaning scenario, the cleanliness of the fluid line can be monitored in real time during a cleaning operation. When a required cleanliness in the fluid line is obtained, the cleaning operation can be stopped immediately saving both valuable time and solvent.

A determination of the at least one parameter value in real time may comprise repeatingly processing the electronic response data and determining the at least one parameter value within less than 0.1 s, such as within less than 0.01 s.

The at least one parameter may comprise solid content, gas bubble content, viscosity, chemical composition and/or speed of sound. The speed of sound of the fluid is for example closely linked to the chemical composition of the fluid. One example of solid content is particles, such as metal flakes.

By means of the ultrasonic waves, the method provides a determination of a wide range of different parameters. This enables a more accurate identification of a characteristic of the fluid in the fluid line.

Furthermore, some solvents and paints may have the same optical transparency or may not be transparent at all. However, by analyzing the speed of sound through such solvents and such paints, their different chemical compositions can be revealed and a more accurate knowledge of the constituents of the fluid inside the fluid line can be provided.

The method may comprise conducting the cleaning medium through the fluid line. In this case, the method may further comprise stopping the conduction of the cleaning medium when at least one parameter value reaches a threshold value associated with the parameter. The threshold value may for example be a value representing a required cleanliness of the fluid line.

The method may further comprise providing a first property value of the first coating medium, a second property value of the second coating medium and/or a third property value of the cleaning medium. In this case, the threshold value may be determined based on the first property value, the second property value and/or the third property value. In the example of a threshold value being a value representing a required cleanliness of the fluid line, the required cleanliness can thus be controlled in dependence of the first property value, the second property value and/or the third property value.

According to a further aspect, there is provided a control system for determining a characteristic of a fluid in an apparatus for applying a coating medium to an object, the apparatus comprising a fluid line;

an outlet; a first coating medium source containing a first coating medium; a second coating medium source containing a second coating medium; a cleaning medium source containing a cleaning medium; and a valve arrangement configured to independently bring each of the first coating medium source, the second coating medium source and the cleaning medium source in communication with the outlet through the fluid line. The control system comprises at least one data processing device and at least one memory having a computer program stored thereon, the computer program comprising program code which, when executed by the at least one data processing device, causes the at least one data processing device to perform the steps of commanding fluid to be conducted through the fluid line, the fluid comprising the first coating medium, the second coating medium and/or the cleaning medium; commanding an ultrasonic device to send ultrasonic waves to the fluid in the fluid line; receiving electronic response data from the ultrasonic device, the electronic response data being converted from echo signals induced in the fluid by the ultrasonic waves; and determining at least one parameter value of the fluid in the fluid line based on the electronic response data.

The step of commanding fluid to be conducted through the fluid line may for example comprise sending a corresponding command signal to the valve arrangement. The computer program may further comprise program code which, when executed by the at least one data processing device, causes the at least one data processing device to perform, or command performance of, various steps as described herein.

According to a further aspect, there is provided an apparatus for applying a coating medium to an object, the apparatus comprising the fluid line; the outlet; the first coating medium source containing the first coating medium; the second coating medium source containing the second coating medium; the cleaning medium source containing the cleaning medium; the valve arrangement; and the control system according to the present disclosure.

The apparatus may be of any type as described herein. The outlet may for example be an atomizer or other type of spray nozzle.

The apparatus may further comprise a flow metering device arranged on the fluid line between the valve arrangement and the outlet. Examples of flow metering devices are a flow control valve and a pump. The step of commanding fluid to be conducted through the fluid line may in this case optionally comprise sending a corresponding command signal to the flow metering device.

The apparatus may further comprise the ultrasonic device configured to send ultrasonic waves to the fluid in the fluid line; sense echo signals induced in the fluid by the ultrasonic waves; and convert the echo signals to electronic response data. The ultrasonic device may be positioned between the valve arrangement and the outlet.

The ultrasonic device may comprise a first ultrasonic transmitter arranged to send ultrasonic waves to the fluid in the fluid line in a first direction; a second ultrasonic transmitter, distanced from the first ultrasonic transmitter, and arranged to send ultrasonic waves to the fluid in the fluid line in a second direction, substantially opposite to, or opposite to, the first direction; a first ultrasonic receiver arranged to sense echo signals induced in the fluid by the ultrasonic waves from the second ultrasonic transmitter; and a second ultrasonic receiver, distanced from the first ultrasonic receiver, and arranged to sense echo signals induced in the fluid by the ultrasonic waves from the first ultrasonic transmitter. The first direction may be substantially parallel with, or parallel with, a flow direction in the fluid line through the ultrasonic device.

The apparatus may comprise a first ultrasonic transducer comprising the first ultrasonic transmitter and the first ultrasonic receiver, and a second ultrasonic transducer comprising the second ultrasonic transmitter and the second ultrasonic receiver.

The ultrasonic device may be arranged outside the fluid line. For example, the first ultrasonic transmitter, the first ultrasonic receiver, the second ultrasonic transmitter and the second ultrasonic receiver may be arranged outside the fluid line. In this way, the ultrasonic device does not interrupt a flow of fluid through the fluid line. This in turn enables a more accurate determination of the at least one parameter value.

The ultrasonic device may comprise a tube constituting a part of the fluid line. The tube may be straight and/or rigid.

According to a further aspect, there is provided a robot system comprising a control system according to the present disclosure or an apparatus according to the present disclosure, and an industrial robot. The robot system may be of any type as described herein.

The industrial robot may comprise a manipulator, e.g. independently programmable to move in three or more axes. The apparatus may be partly or entirely arranged in the manipulator. According to one example, the ultrasonic device and at least a part of the fluid line are arranged in the manipulator.

BRIEF DESCRIPTION OF THE DRAWINGS

Further details, advantages and aspects of the present disclosure will become apparent from the following description taken in conjunction with the drawings, wherein.

6

Figure 3A:
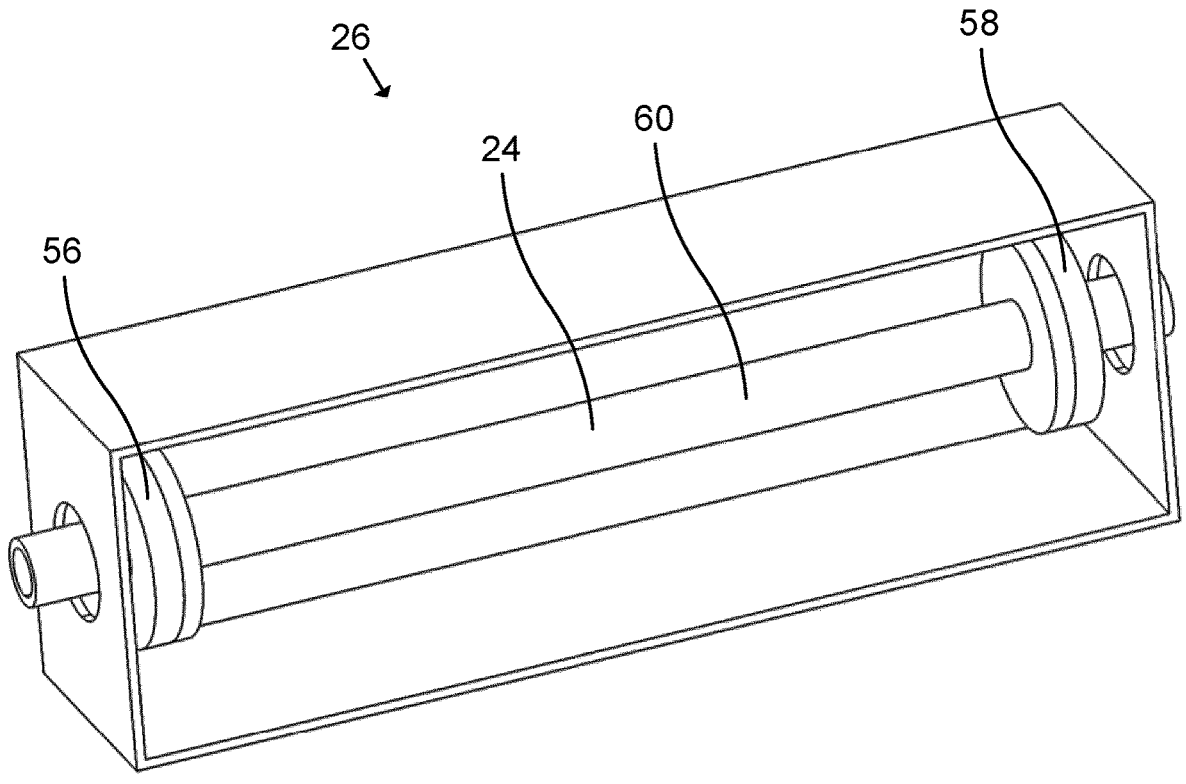
Figure 3B:
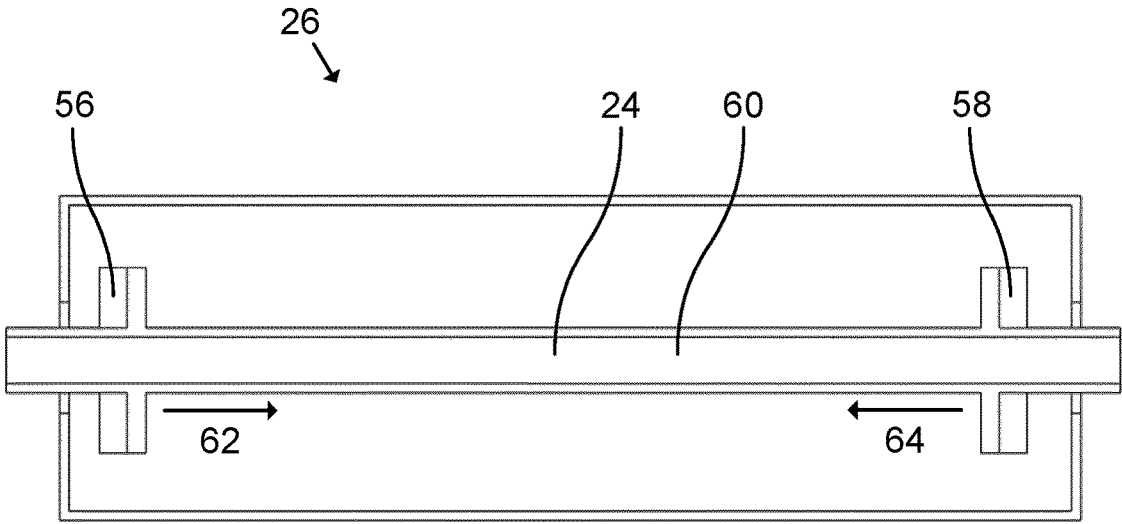
Figure 4:
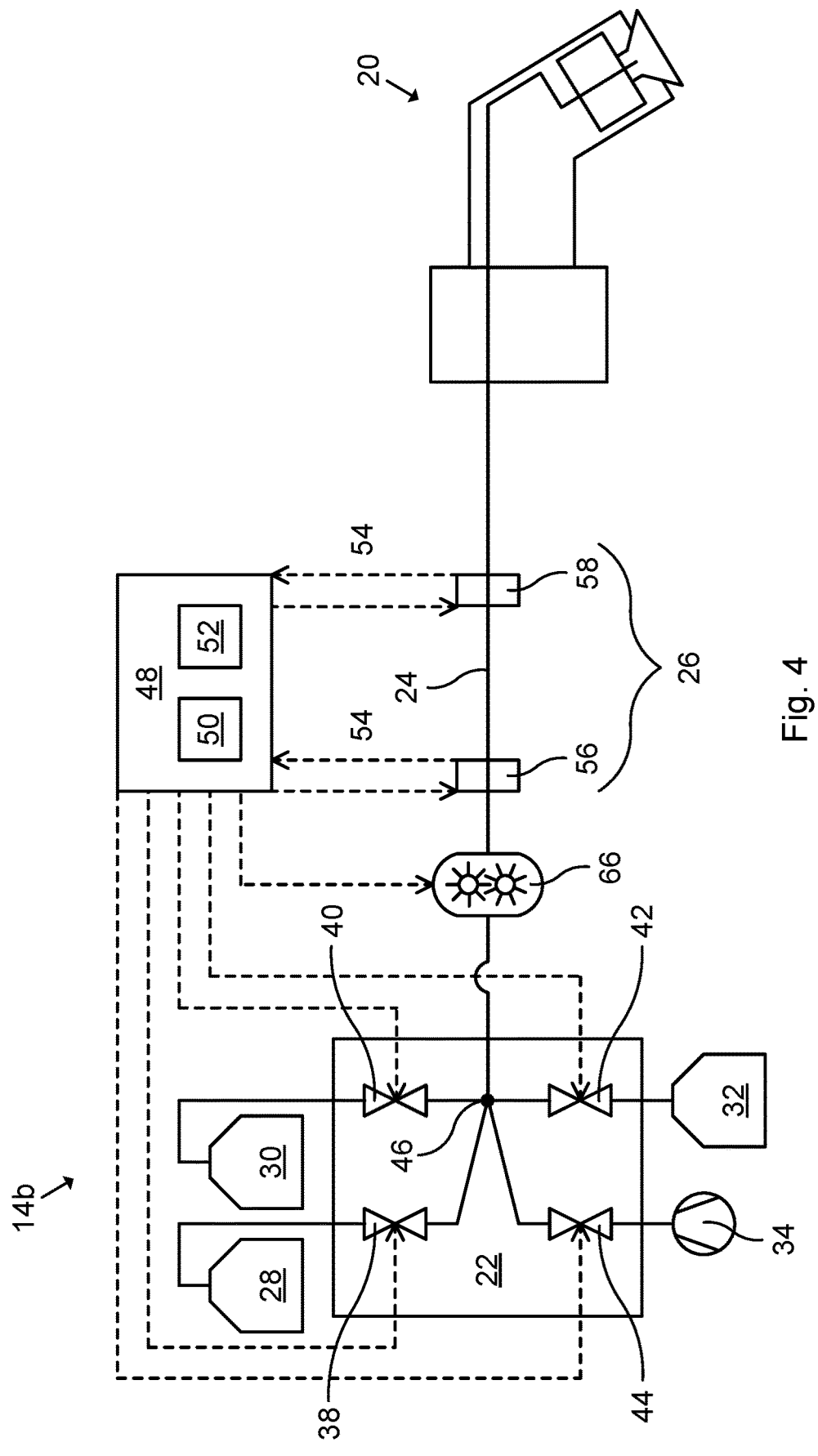

FIG. 3a: schematically represents a perspective view of an ultrasonic device of the apparatus;

FIG. 3b: schematically represents a cross-sectional side view of the ultrasonic device; and FIG. 4: schematically represents an apparatus according to a further example.

DETAILED DESCRIPTION

In the following, a method of determining a characteristic of a fluid in an apparatus for applying a coating medium to an object, a control system for determining a characteristic of a fluid in an apparatus, an apparatus for applying a coating medium to an object, and a robot system comprising an industrial robot, will be described. The same or similar reference numerals will be used to denote the same or similar structural features.

Figure 1:
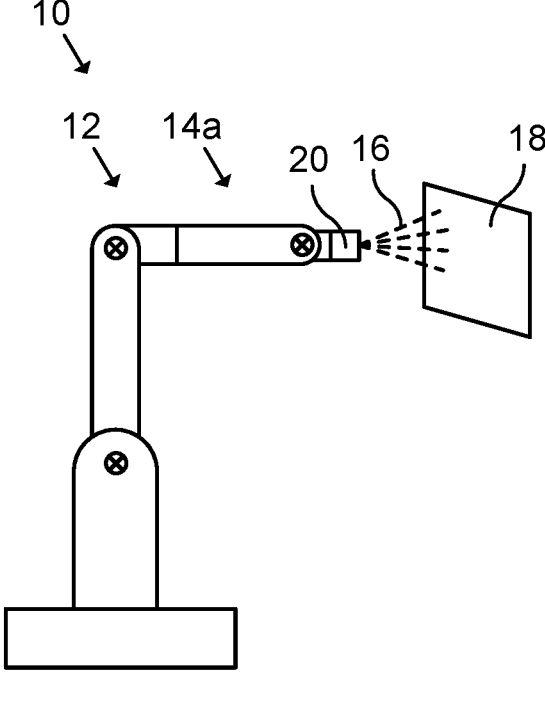
FIG. 1: schematically represents a robot system comprising an industrial robot and an apparatus for applying a coating medium to an object.

FIG. 1 schematically represents a robot system 10. The robot system 10 comprises an industrial robot 12 and an apparatus 14a. The industrial robot 12 comprises a manipulator movable in at least three axes, such as in six or seven axes. The apparatus 14a is configured to apply paint 16 to an object 18, as shown in FIG. 1. The paint 16 is one example of a coating medium as described herein. The object 18 may for example be a body part of a vehicle.

FIG. 1 shows that the apparatus 14a comprises an atomizer 20. The atomizer 20 is one example of an outlet as described herein. The atomizer 20 is here positioned at a distal end of the manipulator.

Figure 2:
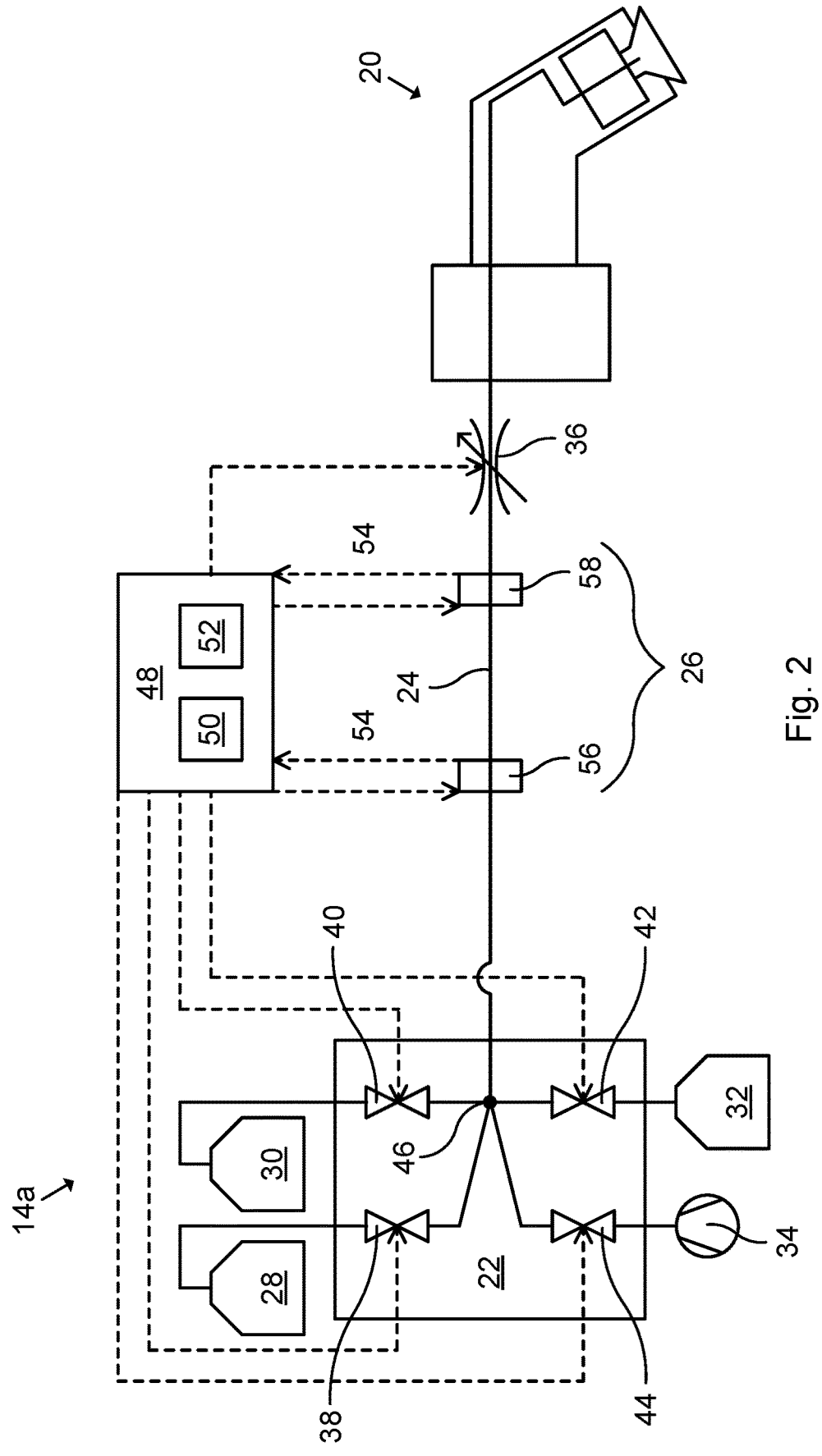
FIG. 2: schematically represents the apparatus.

FIG. 2 schematically represents the apparatus 14a. In addition to the atomizer 20, the apparatus 14a further comprises a valve arrangement 22, a fluid line 24 and an ultrasonic device 26. The fluid line 24 is arranged to conduct a fluid from the valve arrangement 22 to the atomizer 20. The ultrasonic device 26 is positioned on the fluid line 24. The apparatus 14a may be entirely or partly arranged in the manipulator.

The apparatus 14a of this example further comprises a first paint source 28 containing paint of a first color, a second paint source 30 containing paint of a second color, a solvent source 32 containing solvent and a compressor 34 for supplying compressed air. The first paint source 28, the second paint source 30 and the solvent source 32 are thus examples of a first coating medium source, a second coating medium source and a cleaning medium source, respectively, according to the present disclosure. Although only two paint sources 28 and 30 are illustrated, the apparatus 14a may comprise at least ten different paint sources, such as 20 to 30 different paint sources.

The apparatus 14a further comprises a flow control valve 36. The flow control valve 36 is one example of a flow metering device according to the present disclosure. By means of the flow control valve 36 the flow through the fluid line 24 can be controlled and monitored. In this example, the flow control valve 36 is positioned downstream of the ultrasonic device 26, i.e. between the ultrasonic device 26 and the atomizer 20. The flow control valve 36 may form part of the valve arrangement 22.

The valve arrangement 22 of this example comprises a first paint valve 38 associated with the first paint source 28, a second paint valve 40 associated with the second paint source 30, a solvent valve 42 associated with the solvent source 32 and a compressor valve 44 associated with the compressor 34. Each of the first paint valve 38, the second paint valve 40, the solvent valve 42 and the compressor valve 44 is here exemplified as a 2/2 valve. The valve arrangement 22 here functions as a color changer.

The valve arrangement 22 of this example further comprises a junction 46. The fluid line 24 extends from the junction 46 to the atomizer 20.

The first paint source 28 is connected to the junction 46 via a unique line comprising the first paint valve 38. When the first paint valve 38 and the flow control valve 36 are open, the first paint flows from the valve arrangement 22, through the fluid line 24, through the flow control valve 36 and through the atomizer 20.

The second paint source 30 is connected to the junction 46 via a unique line comprising the second paint valve 40. When the second paint valve 40 and the flow control valve 36 are open, the second paint flows from the valve arrangement 22, through the fluid line 24, through the flow control valve 36 and through the atomizer 20.

The solvent source 32 is connected to the junction 46 via a unique line comprising the solvent valve 42. When the solvent valve 42 and the flow control valve 36 are open, the solvent flows from the valve arrangement 22, through the fluid line 24, through the flow control valve 36 and through the atomizer 20.

The compressor 34 is connected to the junction 46 via a unique line comprising the compressor valve 44. When the compressor valve 44 and the flow control valve 36 are open, air flows from the valve arrangement 22, through the fluid line 24, through the flow control valve 36 and through the atomizer 20.

The valve arrangement 22 is thus configured to independently bring each of the first paint source 28, the second paint source 30, the solvent source 32 and the compressor 34 in fluid communication with the atomizer 20 through the fluid line 24. The valve arrangement 22 and the ultrasonic device 26 may for example be provided in a third arm of the industrial robot 12.

The apparatus 14a further comprises a control system 48. The control system 48 comprises a data processing device 50 and a memory 52 having a computer program stored thereon. The computer program comprises program code which, when executed by the data processing device 50, causes the data processing device 50 to perform, and/or command performance of, various steps as described herein. The control system 48 is in signal communication with the valve arrangement 22. In this example, the control system 48 is in signal communication with, to command opening and closing of, each of the first paint valve 38, the second paint valve 40, the solvent valve 42 and the compressor valve 44.

The control system 48 is also in signal communication with the flow control valve 36 to control the flow through the fluid line 24. A degree of opening commanded to the flow control valve 36 can be used as a measure of the flow through the fluid line 24.

The ultrasonic device 26 is configured to send ultrasonic waves to the fluid in the fluid line 24, to sense echo signals induced in the fluid by the ultrasonic waves, and to convert the echo signals to electronic response data 54. The ultrasonic device 26 of this example comprises a first ultrasonic transducer 56 and a second ultrasonic transducer 58, here arranged downstream of the first ultrasonic transducer 56. The control system 48 is configured to control the ultrasonic device 26 and to receive the electronic response data 54 from each of the first ultrasonic transducer 56 and the second ultrasonic transducer 58.

FIG. 3a schematically represents a perspective view of the ultrasonic device 26, and FIG. 3b schematically represents a cross-sectional side view of the ultrasonic device 26. With collective reference to FIGS. 3a and 3b, the ultrasonic device 26 comprises a tube 60. The tube 60 is here straight and rigid. The tube 60 may for example be made of plastic or metal. In this implementation, the tube 60 constitutes a part of the fluid line 24. An upstream hose may be connected between the junction 46 and the tube 60, and a downstream hose may be connected between the tube 60 and the atomizer 20.

Each of the first ultrasonic transducer 56 and the second ultrasonic transducer 58 surrounds the fluid line 24 and is arranged entirely outside the fluid line 24. The fluid flowing through the fluid line 24 is thereby not interfered with. The straight tube 60 and the arrangement of the ultrasonic device 26 outside the fluid line 24 thus provide an unobstructed flow path for the fluid.

The first ultrasonic transducer 56 comprises a first ultrasonic transmitter and a first ultrasonic receiver (not denoted). The second ultrasonic transducer 58 comprises a second ultrasonic transmitter and a second ultrasonic receiver (not denoted). The first ultrasonic transmitter is configured to send ultrasonic 3o waves in a first direction 62. Echo signals induced in the fluid by the ultrasonic waves in the first direction 62 are sensed by the second ultrasonic receiver. The second ultrasonic transmitter is configured to send ultrasonic waves in a second direction 64, opposite to the first direction 62. Echo signals induced in the fluid by the ultrasonic waves in the second direction 64 are sensed by the first ultrasonic receiver. Each ultrasonic transducer 56 and 58 may for example be configured to determine a time of flight of the ultrasonic waves therebetween. The time of flight may be communicated to the control system 48 as electronic response data 54.

With collective reference to FIGS. 2, 3a and 3b, a method of determining characteristics of fluids passing through the fluid line 24 will be described. When an application of the first paint from the first paint source 28 to the object 18 has finished and an application of the second paint from the second paint source 30 to the object 18 is to be initiated, a cleaning procedure is performed in order to avoid the first paint contaminating the second paint. The cleaning procedure may comprise alternatingly conducting solvent from the solvent source 32 and air from the compressor 34 through the fluid line 24 to remove the first paint therefrom.

The characteristics of each paint may differ significantly. Examples of such characteristics are solid content, gas bubble content, viscosity, chemical composition and/or speed of sound. Some or all of these characteristics may impact the cleanability of the paint, which in turn affects the time and volume of solvent required to clean the fluid line 24.

During the cleaning procedure, the ultrasonic device 26 continuously subjects the fluid in the fluid line 24 to ultrasonic pulses and provides corresponding electronic response data 54. The control system 48 determines one or more parameter values of the fluid in real time based on the electronic response data 54 from the ultrasonic device 26. In this example, a speed of sound through the fluid in the fluid line 24 and between the ultrasonic transducers 56 and 58 is used as a parameter of the fluid.

A property value may be determined for each color in the apparatus 14a. A property value may also be determined for the solvent. Since the speed of sound is used as the parameter in this example, speeds of sound are here also used as the property values. That is, a first speed of sound through pure first paint, a second speed of sound through pure second paint and a third speed of sound through pure solvent may be determined beforehand, e.g. based on experiments, calculations and/or supplier data.

A threshold value associated with a required cleanliness for the cleaning procedure may then be determined based on one or more of the property values. One or several such threshold values may be predefined in the control system 48. The required cleanliness depends on the properties of the previous and the next color. For example, if the first color is black and the second color is white, a high cleanliness of the fluid line 24 is required before applying the white color in order to avoid contamination by the black color. In this case, the threshold value may be set close to the speed of sound through pure solvent. Thus, prior to cleaning the fluid line 24, the speed of sound through the fluid line 24 containing the black color substantially corresponds to the speed of sound through the black color. As solvent is introduced into the fluid line 24, the speed of sound measurement will gradually change closer and closer to the threshold value. When the fluid line 24 is completely cleaned by the solvent, no black color exists in the fluid line 24. The speed of sound through the fluid line 24 containing only solvent then substantially corresponds to the speed of sound through solvent. The cleanliness requirement is thereby fulfilled.

As a further example, if the first color is light green and the second color is a slightly darker green, some light green color may remain in the fluid line 24 before initiating the application of the subsequent darker green color without visibly affecting the finish on the object 18. In this case, the threshold value may for example be set to an average between the speeds of sound of the dark green color and the solvent. In this way, an optimized cleaning 3*o* performance can be provided for each color by means of the ultrasonic device 26.

The electronic response data 54 containing information indicative of a current level of cleanliness in the fluid line 24 is continuously fed back to the control system 48 which stops the cleaning procedure as soon as the required cleanliness is achieved. Thus, after determining that the parameter value reaches the threshold value, the control system 48 commands the solvent valve 42 to close and the second paint valve 40 to open. The user of the robot system 10 therefore saves both costs associated with the consumption of solvent, and time.

During the cleaning procedure, the fluid may be discharged into a disposal container. Alternatively, the fluid may be recirculated within the apparatus 14*a*.

When the cleanliness criterion is fulfilled and the cleaning process is stopped, the second paint can be applied to the object 18. The ultrasonic device 26 may however also monitor the fluid at times other than during cleaning operations, for example to detect occurrence of gas bubbles in the applied paint. The occurrence of gas bubbles can have different origins, for example a leakage or a chemical process occurring in a recently mixed paint. In case bubbles appear in the paint stream, the painting quality may be deteriorated.

FIG. 4 schematically represents an apparatus 14*b* according to a further example. The apparatus 14*b* differs from the apparatus 14*a* in that the apparatus 14*b* comprises a gear pump 66 instead of the flow control valve 36. The gear pump 66 is provided on the fluid line 24 between the valve arrangement 22 and the ultrasonic device 26. The gear pump 66 is a further example of a flow metering device according to the present disclosure. By means of the gear pump 66, the fluid in the fluid line 24 can be propelled towards the atomizer 20.

While the present disclosure has been described with reference to exemplary embodiments, it will be appreciated that the present invention is not limited to what has been described above. For example, it will be appreciated that the 3*o* dimensions of the parts may be varied as needed. Accordingly, it is intended that the present invention may be limited only by the scope of the claims appended hereto.

The invention claimed is:

1. A method of determining a characteristic of a fluid in an apparatus for applying a coating medium to an object, the apparatus including:
   a fluid line;
   an outlet;
   a first coating medium source containing a first coating medium;
   a second coating medium source containing a second coating medium;
   a cleaning medium source containing a cleaning medium; and
   a valve arrangement configured to independently bring each of the first coating medium source, the second coating medium source and the cleaning medium source in communication with the outlet through the fluid line;
   wherein the method comprises:
      conducting a fluid through the fluid line, the fluid including the first coating medium, the second coating medium and/or the cleaning medium;
      sending ultrasonic waves to the fluid in the fluid line;
      sensing echo signals induced in the fluid by the ultrasonic waves;
      converting the echo signals to electronic response data;
      determining a parameter value of at least one parameter of the fluid in the fluid line based on the electronic response data;
      conducting the cleaning medium through the fluid line;
      stopping the conduction of the cleaning medium when at least one parameter value reaches a threshold value associated with the parameter; and
      providing a first property value of the first coating medium, a second property vale of the second coating medium and/or a third property value of the cleaning medium, wherein the threshold value is determined based on the first property value, the second property value and/or the third property value.

2. The method according to claim 1, further comprising controlling the valve arrangement based on the at least one parameter value.

3. The method according to claim 1, wherein the at least one parameter value is determined in real time.

4. The method according to claim 1, wherein the at least one parameter comprises solid content, gas bubble content, viscosity, chemical composition and/or speed of sound.

5. A control system for determining a characteristic of a fluid in an apparatus for applying a coating medium to an object, the apparatus comprising:
   a fluid line;
   an outlet;
   a first coating medium source containing a first coating medium;
   a second coating medium source containing a second coating medium;
   a cleaning medium source containing a cleaning medium;
   a valve arrangement configured to independently bring each of the first coating medium source, the second coating medium source and the cleaning medium source in communication with the outlet through the fluid line; and

wherein the control system has at least one data processing device and at least one memory having a computer program stored thereon, the computer program including a program code which, when executed by the at least one data processing device, causes the at least one data processing device to perform the steps of:

commanding fluid to be conducted through the fluid line, the fluid including the first coating medium, the second coating medium and/or the cleaning medium;

commanding an ultrasonic device to send ultrasonic waves to the fluid in the fluid line;

receiving electronic response data from the ultrasonic device, the electronic response data being converted from echo signals induced in the fluid by the ultrasonic waves;

determining a parameter value of at least one parameter of the fluid in the fluid line based on the electronic response data;

commanding conduction of the cleaning medium through the fluid line;

commanding stopping of the conduction of the cleaning medium when at least one parameter value reaches a threshold value associated with the parameter; and providing a first property value of the first coating medium, a second property value of the second coating medium and/or a third property value of the cleaning medium, wherein the threshold value is determined based on the first property value, the second property value and/or the third property value.

6. An apparatus for applying a coating medium to an object, the apparatus comprising:

a fluid line;

an outlet;

a first coating medium source containing a first coating medium;

a second coating medium source containing a second coating medium;

a cleaning medium source containing a cleaning medium;

a valve arrangement configured to independently bring each of the first coating medium source, the second coating medium source and the cleaning medium source in communication with the outlet through the fluid line; and a control system having at least one data processing device and at least one memory having a computer program stored thereon, the computer program including a program code which, when executed by the at least one data processing device, causes the at least one data processing device to perform the steps of:

commanding fluid to be conducted through the fluid line, the fluid including the first coating medium, the second coating medium and/or the cleaning medium;

commanding an ultrasonic device to send ultrasonic waves to the fluid in the fluid line;

receiving electronic response data from the ultrasonic device, the electronic response data being converted from echo signals induced in the fluid by the ultrasonic waves;

determining a parameter value of at least one parameter of the fluid in the fluid line based on the electronic response data;

commanding conduction of the cleaning medium through the fluid line;

commanding stopping of the conduction of the cleaning medium when at least one parameter value reaches a threshold value associated with the parameter; and providing a first property value of the first coating medium, a second property value of the second coating medium and/or a third property value of the cleaning medium, wherein the threshold value is determined based on the first property value, the second property value and/or the third property value.

7. The apparatus according to claim 6, further comprising the ultrasonic device configured to:

send ultrasonic waves to the fluid in the fluid line;

sense echo signals induced in the fluid by the ultrasonic waves; and convert the echo signals to electronic response data.

8. The apparatus according to claim 7, wherein the ultrasonic device comprises:

a first ultrasonic transmitter arranged to send ultrasonic waves to the fluid in the fluid line in a first direction;

a second ultrasonic transmitter, distanced from the first ultrasonic transmitter, and arranged to send ultrasonic waves to the fluid in the fluid line in a second direction, substantially opposite to the first direction;

a first ultrasonic receiver arranged to sense echo signals induced in the fluid by the ultrasonic waves from the second ultrasonic transmitter; and a second ultrasonic receiver, distanced from the first ultrasonic receiver, and arranged to sense echo signals induced in the fluid by the ultrasonic waves from the first ultrasonic transmitter.

9. The apparatus according to claim 8, wherein the apparatus comprises a first ultrasonic transducer including the first ultrasonic transmitter and the first ultrasonic receiver, and a second ultrasonic transducer including the second ultrasonic transmitter and the second ultrasonic receiver.

10. The apparatus according to claim 7, wherein the ultrasonic device is arranged outside the fluid line.

11. The apparatus according to claim 7, wherein the ultrasonic device comprises a tube constituting a part of the fluid line.

12. A robot system comprising:

a control system for determining a characteristic of a fluid in an apparatus for applying a coating medium to an object, the apparatus including:

a fluid line;

an outlet;

a first coating medium source containing a first coating medium;

a second coating medium source containing a second coating medium;

a cleaning medium source containing a cleaning medium; and a valve arrangement configured to independently bring each of the first coating medium source, the second coating medium source and the cleaning medium source in communication with the outlet through the fluid line;

wherein the control system has at least one data processing device and at least one memory having a computer program stored thereon, the computer program including a program code which, when executed by the at least one data processing device, causes the at least one data processing device to perform the steps of:

commanding fluid to be conducted through the fluid line, the fluid including the first coating medium, the second coating medium and/or the cleaning medium;

commanding an ultrasonic device to send ultrasonic waves to the fluid in the fluid line;

receiving electronic response data from the ultrasonic device, the electronic response data being converted from echo signals induced in the fluid by the ultrasonic waves;

determining a parameter value of at least one parameter of the fluid in the fluid line based on the electronic response data;

commanding conduction of the cleaning medium through the fluid line;

commanding stopping of the conduction of the cleaning medium when at least one parameter value reaches a threshold value associated with the parameter; and providing a first property value of the first coating medium, a second property value of the second coating medium and/or a third property value of the cleaning medium, wherein the threshold value is determined based on the first property value, the second property value and/or the third property value; and an industrial robot.

13. The method according to claim 2, wherein the at least one parameter value is determined in real time.

14. The method according to claim 2, wherein the at least one parameter comprises solid content, gas bubble content, viscosity, chemical composition and/or speed of sound.

\* \* \* \* \*